US012591143B2

(12) United States Patent
Gollier

(10) Patent No.: US 12,591,143 B2
(45) Date of Patent: *Mar. 31, 2026

(54) DEVICES WITH MONOCHROMATIC LIQUID CRYSTAL ON SILICON DISPLAYS

(71) Applicant: Meta Platforms Technologies, LLC, Menlo Park, CA (US)

(72) Inventor: Jacques Gollier, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 17/879,625

(22) Filed: Aug. 2, 2022

(65) Prior Publication Data

US 2023/0014747 A1 Jan. 19, 2023

Related U.S. Application Data

(63) Continuation of application No. 15/931,778, filed on May 14, 2020, now Pat. No. 11,402,647.

(Continued)

(51) Int. Cl.
*G02B 27/10* (2006.01)
*G02B 27/01* (2006.01)
(Continued)

(52) U.S. Cl.
CPC ....... *G02B 27/102* (2013.01); *G02B 27/0172* (2013.01); *G02B 27/026* (2013.01); *G03B 21/14* (2013.01); *G02B 2027/0178* (2013.01)

(58) Field of Classification Search
CPC .............. G02B 27/102; G02B 27/0172; G02B 27/026; G02B 2027/0178;
(Continued)

(56) References Cited

U.S. PATENT DOCUMENTS 10,861,417 B2 * 12/2020 Gollier ............... G02B 27/0093
11,181,815 B1 * 11/2021 Wheelwright ..... G02B 27/0093
(Continued)

FOREIGN PATENT DOCUMENTS

CN 104570353 A * 4/2015 ............. G02B 6/122
WO 2018164194 A1 9/2018
WO 2018164914 A2 9/2018

OTHER PUBLICATIONS

International Search Report and Written Opinion for International Application No. PCT/US2020/033527, mailed Aug. 27, 2020, 9 Pages.
(Continued)

*Primary Examiner* — Magda Cruz
(74) *Attorney, Agent, or Firm* — Greenberg Traurig, LLP

(57) ABSTRACT
A method includes projecting a single color illumination light having a first color on a liquid crystal on silicon display device, thereby obtaining a single color image light having the first color from the liquid crystal on silicon display device. The method also includes receiving image light having at least a second color that is different from the first color from a display panel that is different from a liquid crystal on silicon display device and combining the single color image light and the image light for projection toward an eye.

18 Claims, 9 Drawing Sheets

Related U.S. Application Data

(60) Provisional application No. 62/850,510, filed on May 20, 2019.

(51) Int. Cl.
G02B 27/02 (2006.01)
G03B 21/14 (2006.01)

(58) Field of Classification Search
CPC ...... G02B 2027/0118; G02B 2027/014; G02B 2027/015; G02B 2027/0152; G02B 27/1026; G02B 27/0093; G03B 21/14
USPC .......................................................... 353/31
See application file for complete search history.

(56) References Cited

U.S. PATENT DOCUMENTS

| | | | |
|---|---|---|---|
| 11,402,647 B2 * | 8/2022 | Gollier ................. | G02B 27/026 |
| 2014/0104665 A1 | 4/2014 | Popovich et al. | |
| 2016/0131912 A1 | 5/2016 | Border et al. | |
| 2016/0370855 A1 | 12/2016 | Anier et al. | |
| 2017/0090194 A1 | 3/2017 | Hayes | |
| 2018/0143438 A1 | 5/2018 | Oh | |
| 2020/0169725 A1 | 5/2020 | Hua et al. | |
| 2020/0271932 A1 | 8/2020 | Tuomisto et al. | |
| 2020/0273426 A1 | 8/2020 | Gollier et al. | |
| 2020/0310121 A1 * | 10/2020 | Choi ........................ | G02B 6/34 |
| 2021/0011295 A1 | 1/2021 | Sato et al. | |

OTHER PUBLICATIONS

Non-Final Office Action mailed Apr. 27, 2021 for U.S. Appl. No. 15/931,778, filed May 14, 2020, 14 Pages.

Non-Final Office Action mailed Nov. 3, 2021 for U.S. Appl. No. 15/931,778, filed May 14, 2020, 13 pages.

Notice of Allowance mailed Feb. 24, 2022 for U.S. Appl. No. 15/931,778, filed May 14, 2020, 11 pages.

Office Action mailed Dec. 27, 2023 for Chinese Application No. 202080031933.0, filed May 19, 2020, 9 pages.

European Search Report for European Patent Application No. 23159774.1, dated Jun. 21, 2023, 14 pages.

Office Action mailed Sep. 17, 2025 for European Patent Application No. 23159774.1, filed on May 19, 2020, 5 pages.

* cited by examiner

100

Display
110

600

600-1

600-2

600-3

602-1

602-2

602-3

600

600-4

600-5

602-4

604

602-5

602-6

DEVICES WITH MONOCHROMATIC LIQUID CRYSTAL ON SILICON DISPLAYS

RELATED APPLICATIONS

This application is a continuation of U.S. patent application Ser. No. 15/931,778, filed May 14, 2020, which claims the benefit of, and priority to, U.S. Provisional Patent Application Ser. No. 62/850,510, filed May 20, 2019, each of which is incorporated by reference herein in its entirety.

TECHNICAL FIELD

This relates generally to head-mounted display devices, and more specifically to head-mounted display devices with liquid crystal on silicon (LCoS) displays.

BACKGROUND

Head-mounted display devices (also called herein head-mounted displays) are gaining popularity as means for providing visual information to a user. For example, the head-mounted display devices are used for virtual reality, mixed reality, and augmented reality operations.

There is a need for light-weighted and compact-sized head-mounted display systems providing high brightness images for enhancing user experience with virtual reality and/or augmented reality. However, generally display systems providing high brightness and high image quality have a high power consumption which, in turn, decreases the operational time and battery life, and increases the size and weight associated with energy storage (e.g., batteries).

SUMMARY

The above deficiencies and other challenges associated with conventional polychromatic display devices are reduced or eliminated by the disclosed display devices including monochromatic LCoS displays.

In accordance with some embodiments, a method includes projecting a single color illumination light having a first color on a liquid crystal on silicon display device, thereby obtaining a single color image light having the first color from the liquid crystal on silicon display device. The method also includes receiving image light having at least a second color that is different from the first color from a display panel that is different from a liquid crystal on silicon display device and combining the single color image light and the image light for projection toward an eye.

In accordance with some embodiments, a device includes a liquid crystal on silicon display device configured to receive a single color illumination light having a first color and provide a single color image light. The device also includes a display panel that is different from a liquid crystal on silicon display device. The display device is configured to provide image light having at least a second color that is different from the first color. The device further includes a waveguide configured to combine the single color image light and the image light for projection toward an eye.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
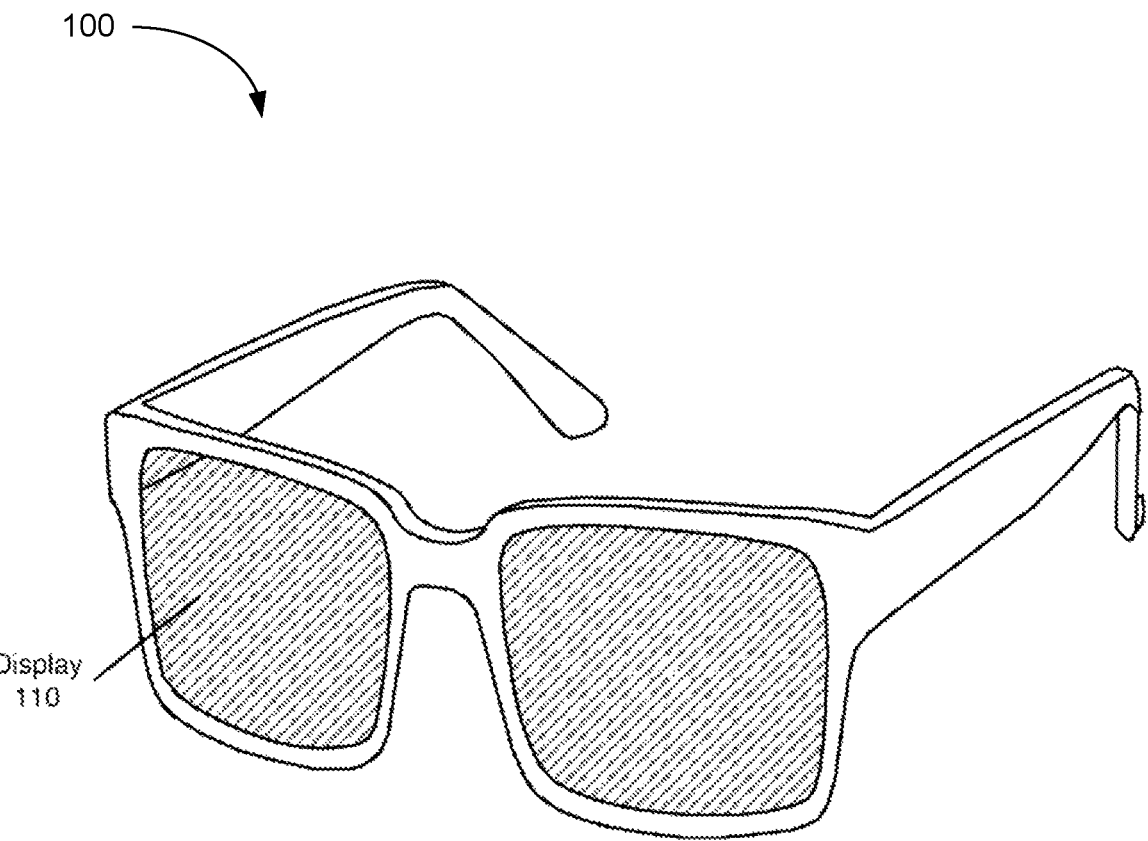
FIG. 1 is a perspective view of a display device in accordance with some embodiments.

These figures are not drawn to scale unless indicated otherwise.

DETAILED DESCRIPTION

Polychromatic (e.g., multicolor) displays, such as light-emission displays (e.g., light-emitting diode (LED) displays or microLED displays), may suffer from challenges arising from a particular color component having a lower efficiency than other color components. For example, red color has a lower efficiency than blue and green colors in microLED displays. Reflective spatial light modulators (e.g., liquid crystal on silicon (LCoS) displays), when configured for polychromatic displays, also suffer from efficiency loss. In addition, conventional polychromatic displays may also suffer from color break-up. Such displays typically require complex optical assemblies for color generation and mixing.

A monochromatic (e.g., a single-color) reflective spatial light modulator configured for a single color component (e.g., red), as described herein, has a higher efficiency than polychromatic reflective spatial light modulators. Such monochromatic reflective spatial light modulator can be combined with display elements for other color components (e.g., blue and green) to enable a high efficiency display system. In addition, a combination of a monochromatic LCoS display and one or more light emission displays facilitates mixing of light of different colors, eliminating or reducing the need for large and complex illumination system. Furthermore, the monochromatic reflective spatial light modulator may operate with a low resolution projection optics without significant degradation in project image quality, which allows use of a wider range of projection lenses.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first display could be termed a second display, and, similarly, a second display could be termed a first display, without departing from the scope of the various described embodiments. The first display and the second display are both displays, but they are not the same display.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
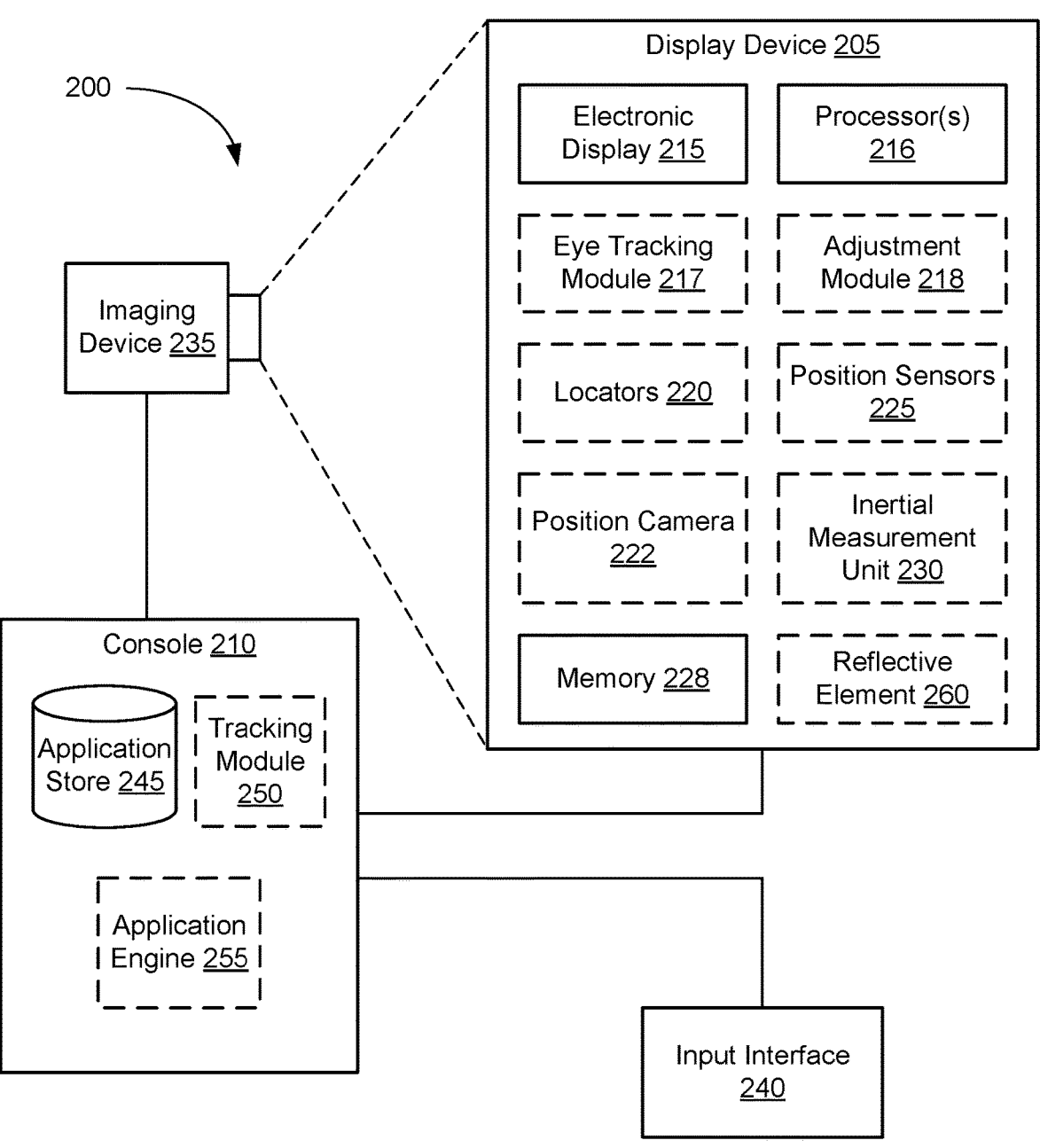
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode (OLED), an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
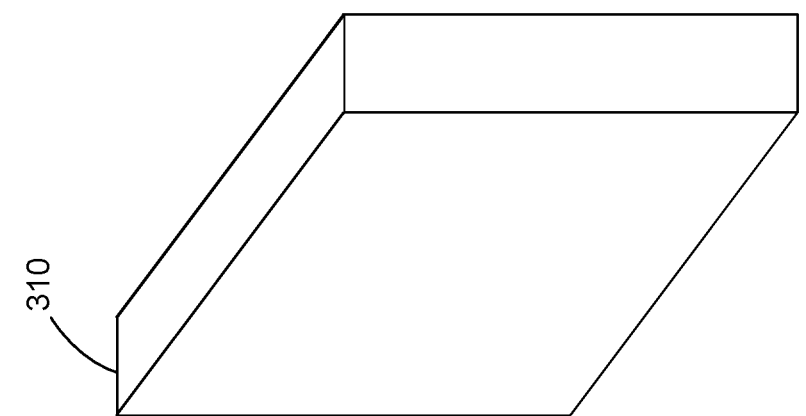
FIG. 3 is an isometric view of a display device in accordance with some embodiments.
Figure 3:
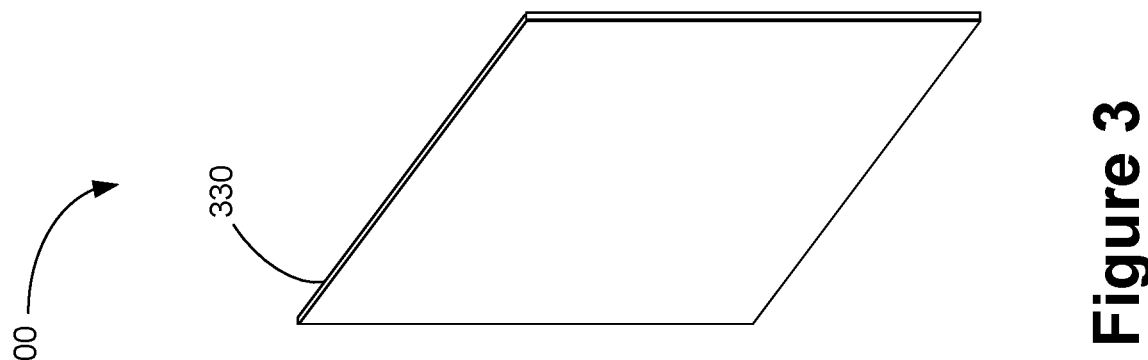
Figure 3:
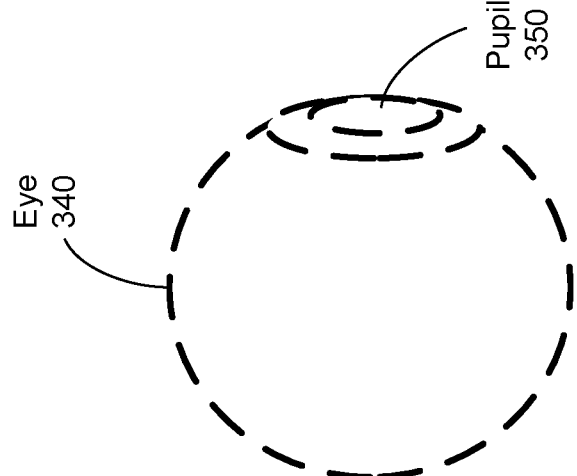

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of superluminescent LEDs, an array of organic LEDs (OLEDs), an array of vertical cavity surface-emitting lasers (VCSELs) or some combination thereof.

In some embodiments, light emission device 310 includes an emission intensity array (e.g., a transmissive spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

In some embodiments, display device 300 (or light emission device array 310 of display device 300) includes a reflective spatial light modulator (SLM), such as a Liquid Crystal on Silicon (LCoS) spatial light modulator. The spatial light modulator is configured to modulate an amplitude or phase of at least a portion of illumination light and output modulated light (e.g., image light). In some embodiments, the LCoS spatial light modulator includes liquid crystals. In some embodiments, the LCoS spatial light modulator includes ferroelectric liquid crystals. The reflective spatial light modulator has an array of pixels (or subpixels), and a respective pixel (or a respective subpixel) is individually controlled to reflect light impinging thereon (e.g., a pixel is activated to reflect light impinging thereon or deactivated to cease reflecting the light impinging thereon).

Figure 4A:
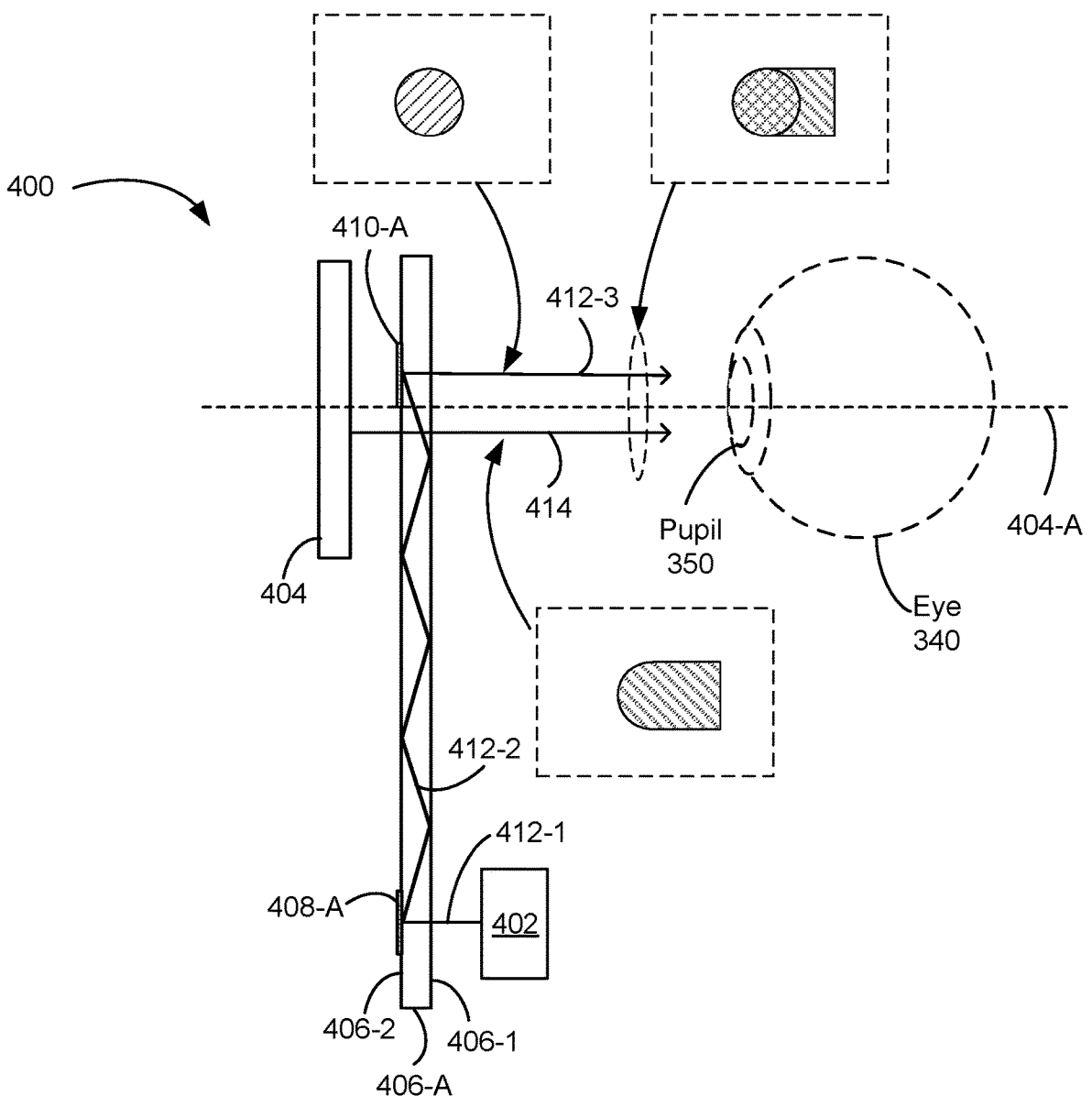
FIG. 4A is a schematic diagram illustrating a display system in accordance with some embodiments.

FIG. 4A is a schematic diagram illustrating display system 400 in accordance with some embodiments. In some embodiments, display system 400 corresponds to display device 300. Display system 400 is configured to project light (e.g., image light) for rendering images based on virtual reality and/or augmented reality content to a user. Display system 400 includes display 402 and display 404 (e.g., a display panel) that is distinct and separate from display 402.

In some embodiments, display 402 is a monochromatic display configured to project light in a first wavelength range (e.g., the first wavelength range corresponding to a single color). In some embodiments, the first wavelength range has a spectral width of 120 nm or narrower, 100 nm or narrower, 90 nm or narrower, 80 nm or narrower, 70 nm or narrower, 60 nm or narrower, 50 nm or narrower, 40 nm or narrower, 30 nm or narrower, 25 nm or narrower, 20 nm or narrower, 15 nm or narrower, 10 nm or narrower, or 5 nm or narrower. In some embodiments, display 402 is a monochromatic reflective spatial light modulator such as a monochromatic reflective liquid crystal on silicon (LCoS). In some embodiments, the monochromatic image light (e.g., image light 412-1) projected by display 402 corresponds to a red light (e.g., light within the wavelength range 700-635 nm). In some embodiments, display 402 includes, or is coupled with, a light source emitting light of a narrow spectral bandwidth (e.g., a laser) or a light source coupled with a bandpass filter or a notch filter having a narrow spectral bandwidth (e.g., a spectral width of 120 nm or narrower, 100 nm or narrower, 90 nm or narrower, 80 nm or narrower, 70 nm or narrower, 60 nm or narrower, 50 nm or narrower, 40 nm or narrower, 30 nm or narrower, 25 nm or narrower, 20 nm or narrower, 15 nm or narrower, 10 nm or narrower, or 5 nm or narrower).

Display 404 is not a reflective spatial light modulator display (e.g., display 404 is not an LCoS display), and does not include a reflective spatial light modulator. For example, display 404 is a light emitting diode (LED) display, microLED display, superluminescent LED (SLED) display, liquid crystal display (LCD), organic LED (OLED) display, active-matrix OLED (AMOLED) display, electrolumines-cent display (ELD), plasma display, quantum dot LED (QLED) display, or any other display other than a reflective spatial light modulator display. In some embodiments, dis-play 404 is an emissive display (e.g., display having one or more active light emitting elements for each pixel, such as OLED display or a microLED display).

Display 404 is configured to project image light (e.g., image light 414) including one or more wavelength ranges of light (e.g., green light within the wavelength range 500-565 nm and/or blue light within the wavelength range 450-490). In some embodiments, the one or more wave-length ranges are distinct from the first wavelength range projected by display 402. In some embodiments, the one or more wavelength ranges do not include the first wavelength range. In some embodiments, the light having the first wavelength range does not include light having the one or more wavelength ranges. In some embodiments, the first wavelength range and the one or more wavelength ranges are mutually exclusive (e.g., the first wavelength range does not even partially overlap with the one or more wavelength ranges so that there is no common wavelength within the first wavelength range and any of the one or more wave-length ranges).

In some embodiments, display 402 is configured to proj-ect light in the first wavelength range and display 404 is configured to project at least one of: light in a second wavelength range and/or light in a third wavelength range, where the first, second, and third wavelength ranges are distinct from each other. In some embodiments, the first, second, and third wavelength ranges do not overlap one another. For example, any of the light in the second wave-length range or the third wavelength range is within the first wavelength range, although in some embodiments, any two of the first, second, and third wavelength ranges may par-tially overlap with each other (e.g., the first wavelength range and the second wavelength range may have a common wavelength although the first wavelength range and the second wavelength range are different from each other). In some embodiments, display 402 projects a red light and display 404 projects a green light and/or a blue light.

In some embodiments, image light 412 projected by display 402 has a first resolution and image light 414 projected by display 404 has a second resolution distinct from the first resolution. In some embodiments, the second resolution is higher than the first resolution. For example, image light 412 corresponding to a monochromatic red light has a lower resolution than image light 414 corresponding to a green and/or a blue light (e.g., image light 412 has 1920×1080 pixel resolution whereas image light 414 has 3840×2160 pixel resolution, or image light 412 has 150 ppi whereas image light 414 has 300 ppi, or image light 412 has 20 μm pixel size or pixel pitch whereas image light 414 has 5 μm pixel size or pixel pitch).

In some embodiments, display 404 is positioned in the field of view of eye 340 of the user of display system 400 (e.g., display 404 is positioned in front of eye 340). In some embodiments, an optical axis of display 404 (e.g., optical axis 404-A) is substantially parallel to an optical axis of eye 340. In some embodiments, display 404 and eye 340 have a substantially common optical axis (e.g., optical axis 404-A). For example, the optical axis of display 404 (e.g., optical axis 404-A) may be collinear to the optical axis of eye 340. Display 402 and display 404 are configured to provide distinct image lights (e.g., image lights 414 and 412) toward a pupil of an eye of a user (e.g., pupil 350 of eye 340). In some embodiments, display 402 is positioned away from a field of view of eye 340 of a user of display system 400 (e.g., display 402 is positioned away from a visual axis of eye 340 or the optical axis of display 404, such as the optical axis 404-A). In some cases, this facilitates operating display system 400 as an augmented reality system.

In some embodiment, the image lights projected from display 402 and display 404 overlap for rendering multicolor images to the user (e.g., image light 412 overlaps at least partially image light 414 when impinging on pupil 350 of eye 340).

In some embodiments, display system 400 further includes waveguide 406-A (e.g., an optical waveguide) positioned adjacent to display 402 (e.g., between display 402 and display 404). Display 402 is optically coupled with waveguide 406-A so that waveguide 406-A delivers image light 412 from display 402 positioned outside the field of view of the eye 340 to a location within the field of view of the eye 340 for projection toward the eye 340. In some embodiments, waveguide 406-A is positioned substantially perpendicular to optical axis 404-A of display 404. Wave-guide 406-A has surface 406-1 facing display 402 and surface 406-2 opposite to surface 406-1.

In some embodiments, waveguide 406-A is coupled with one or more input couplers (e.g., input coupler 408-A) and one or more output couplers (e.g., output coupler 410-A). In some embodiments, input coupler 408-A and output coupler 410-A are coupled with surface 406-2 of waveguide 406-A as shown (e.g., input coupler 408-A and output coupler 410-A are in direct contact with surface 406-2 of waveguide 406-A). The one or more input couplers and the one or more output couplers are either reflective elements or transmission elements. For example, input coupler 408-A is a reflective input coupler coupled with surface 406-2 of waveguide 406-A, as shown in FIG. 4A. In another example, an input coupler is a transmission input coupler coupled with surface 406-1 of waveguide 406-A. In yet another example, output coupler 410-A is either a reflective output coupler coupled with surface 406-2 of waveguide 406-A as shown in FIG. 4A or a transmission output coupler coupled with surface 406-1 of waveguide 406-A. In some embodiments, the one or more input couplers and one or more output couplers include one or more reflectors (e.g., one or more mirrors), one or more partial reflectors (e.g., one or more partial mirrors), one or more gratings (e.g., one or more surface relief gratings, Bragg gratings, or holographic gratings), one or more tun-able liquid crystal components (e.g., liquid crystal gratings), or one or more polarization selective gratings (e.g., one or more reflective polarizers).

In FIG. 4A, display 402 is positioned to project image light 412-1 toward waveguide 406-A (e.g., an optical wave-guide). In some embodiments, display 402 projects image light 412-1 substantially parallel to optical axis 404-A (e.g., display 402 has an optical axis substantially parallel to optical axis 404-A). Image light 412-1 is transmitted through surface 406-1 of waveguide 406-A and received by input coupler 408-A. Input coupler 408-A redirects at least a portion of image light 412-1 as image light 412-2. Due to the redirection by input coupler 408-A, image light 412-2 impinges on surface 406-1 of waveguide 406-A at an incident angle that is above a critical angle associated with waveguide 406-A. The critical angle refers to an angle of incidence above which light passing through a denser medium (e.g., waveguide 406-A) to a surface of a less dense medium (e.g., air outside waveguide 406-A) is reflected by total internal reflection (e.g., the critical angle is an angle of incidence above which a total internal reflection occurs). Image light 412-2 thereby undergoes a total internal reflection inside waveguide 406-A and propagates through the waveguide 406-A via repeated occurrences of total internal reflection, as shown by the zig-zagging light path of image light 412-2 in FIG. 4A.

Output coupler 410-A is positioned to receive image light 412-2 propagating inside waveguide 406-A and redirect at least a portion of image light 412-2 as image light 412-3 to exit waveguide 406-A toward pupil 350 of eye 340. Although only one output coupler 410-A is shown in FIG. 4A, display system 400 may include two or more output couplers or one large output coupler that spans over an area larger than the size of a pupil. In some embodiments, one or more output couplers (including output coupler 410-A) is configured to redirect image light 412-2 toward pupil 350 while also expanding etendue of image light 412 in display system 400. Etendue refers to a property of light in an optical system characterizing how "spread out" the light is in area and angle. An original input pupil area of image light 412-1 is increased by replication due to multiple interactions with the one or more output couplers.

In some embodiments, display system 400 includes two or more displays 402 and/or two or more displays 404. For example, display system 400 includes one display 402 (e.g., one LCoS display) and two displays 404 (e.g., two LED or microLED displays). In some embodiments, display system 400 is configured to project a red light, a first display 404 is configured to project a green light, and a second display 404 is configured to project a blue light.

Figure 4B:
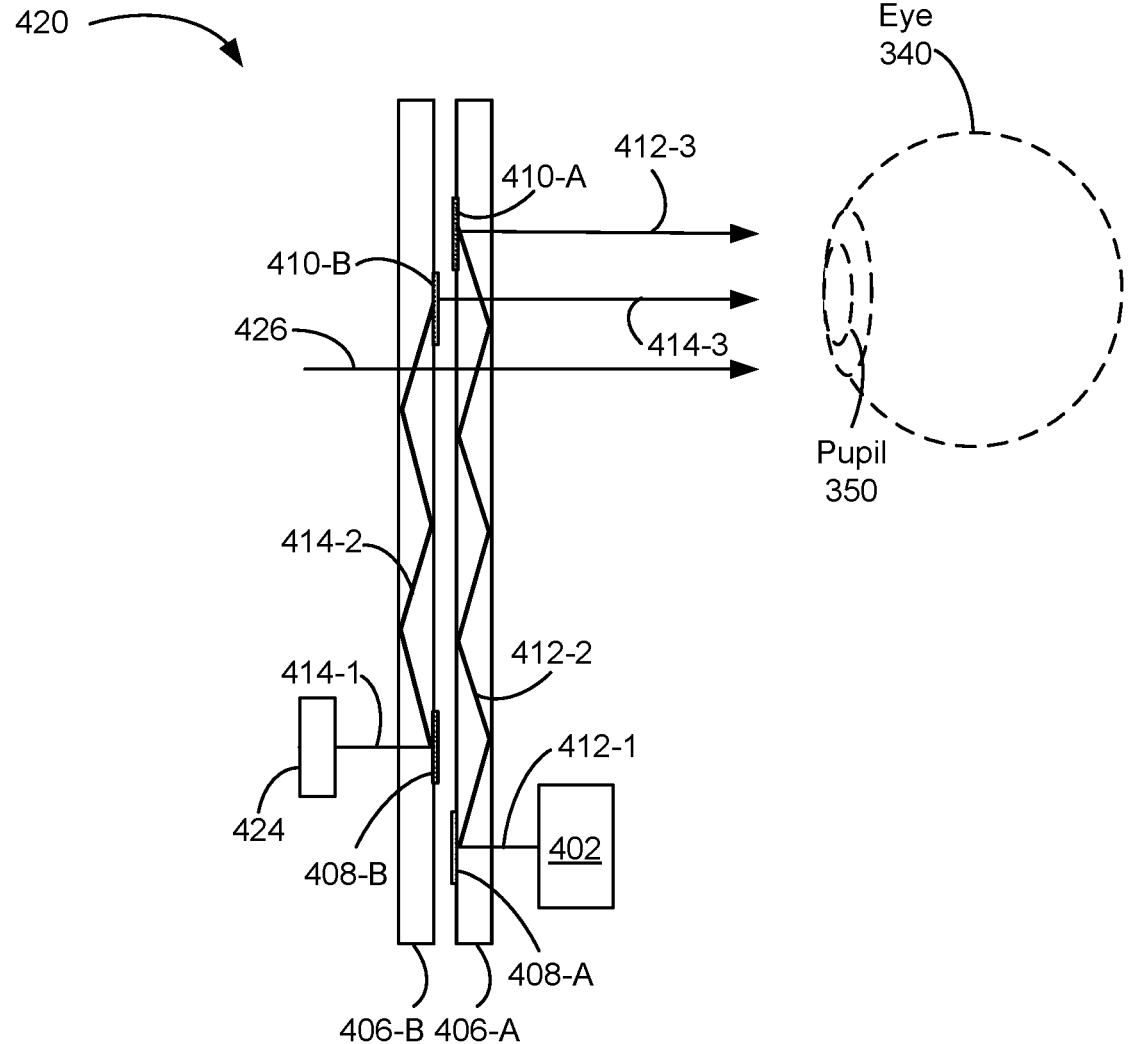
FIG. 4B is a schematic diagram illustrating a display system in accordance with some embodiments.

FIG. 4B is a schematic diagram illustrating display system 420 in accordance with some embodiments. Display system 420 is similar to display system 400 described above with respect to FIG. 4A, except that display system 420 includes display 424 instead of display 404. In some embodiments, display 424 is similar to display 404 (e.g., display 424 is not an LCoS display) but display 424 is positioned away from the field of view of eye 340. In some embodiments, display 424 is coupled with waveguide 406-B. In some embodiments, waveguide 406-B is positioned adjacent to and parallel with waveguide 406-A. In some embodiments, waveguide 406-B is coupled with one or more input couplers (e.g., input coupler 408-B) and one or more output couplers (e.g., output coupler 410-B). In some embodiments, display 424 is positioned to project image light 414-1 toward waveguide 406-B. As shown, input coupler 408-B is positioned to receive light 414-1 and redirect at least a portion of image light 414-1 as image light 414-2 so that image light 414-2 propagates inside waveguide 406-B via total internal reflection. Output coupler 410-B is positioned to receive image light 414-2 propagating inside waveguide 406-B and redirect at least a portion of image light 414-2 as image light 414-3 toward pupil 350 of eye 340.

In some embodiments, display system 420 is an augmented reality or a mixed reality display device. As described above, display system 420 is configured to project image light 412 and 414 from respective displays 402 and 424 toward eye 340 of the user of display system 420. Waveguides 406-A and 406-B are further configured as optical combiners to transmit light (e.g., light 426 corresponding to ambient light) from outside display system 420. Image light 412 and 414 output from display system 420 are combined, or overlapped, with light 426 to form a combined image in the user's eye 340. As a result, the user's perception of the user's surroundings is augmented by images output by display system 420.

Figure 4C:
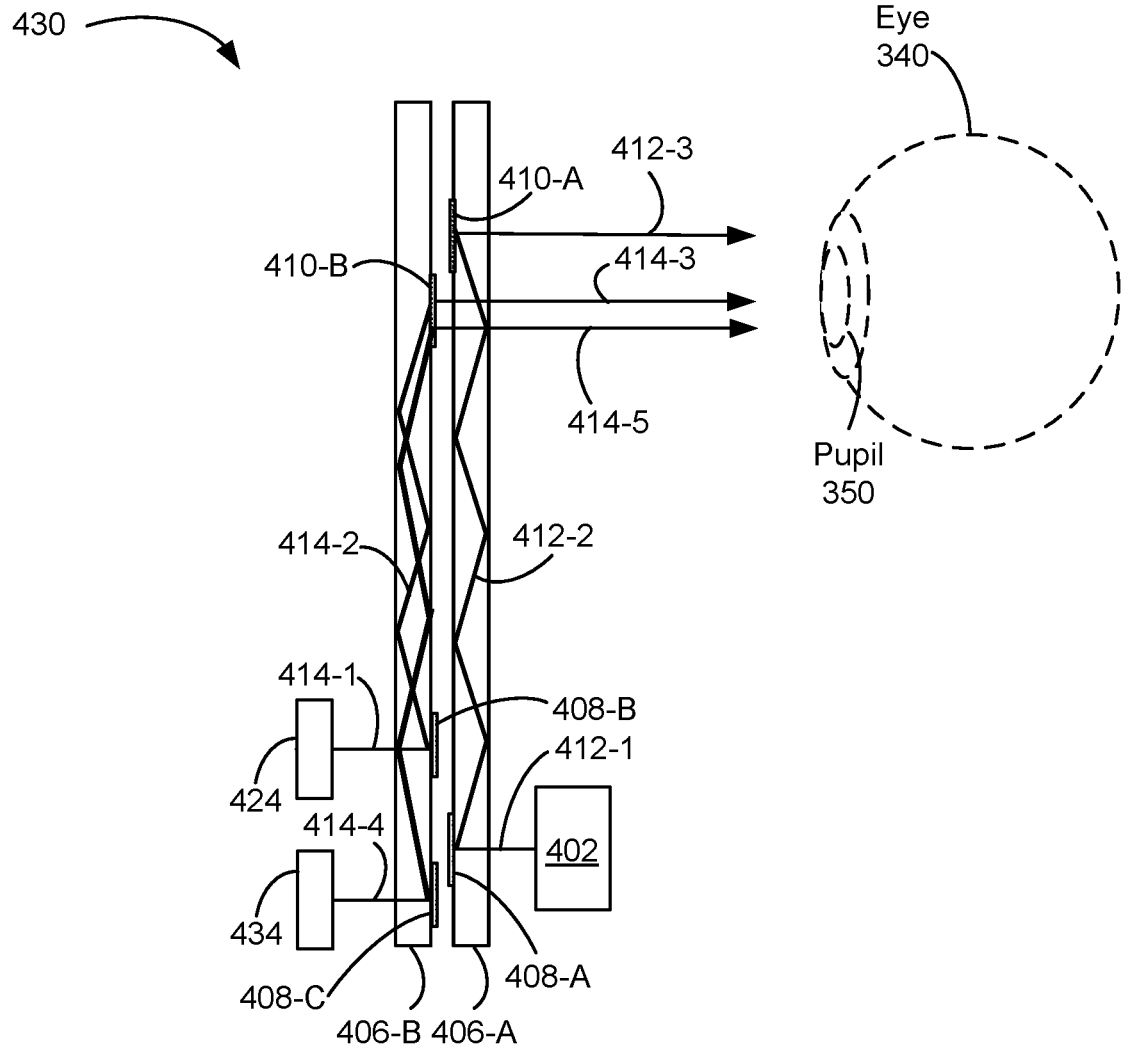
FIG. 4C is a schematic diagram illustrating a display system in accordance with some embodiments.

In some embodiments, single display 424 provides light of a second color and light of a third color (e.g., green and blue). In some embodiments, display system 420 includes two or more displays 402 and/or two or more displays 424. For example, display system 420 may include one display 402 (e.g., one LCoS display) and two displays 424 (e.g., two LED or microLED displays), as shown in FIG. 4C. In some embodiments, display 402 is configured to project a red light, a first display 424 is configured to project a green light, and a second display 424 is configured to project a blue light.

FIG. 4C is a schematic diagram illustrating display system 430 in accordance with some embodiments. Display system 430 is similar to display system 420 described above with respect to FIG. 4B, except that display system 430 includes an additional display (e.g., display 434) similar to display 424. In FIG. 4C, display system 430 is optically coupled with waveguide 406-B. At least a portion of image light 414-4 projected by display 434 is redirected by input coupler 408-C for propagating inside waveguide 406-B and redirected by output coupler 410-B as image light 414-5 toward eye 340. In some embodiments, display system 430 further includes an additional waveguide configured to transfer light from the display 434 instead of using the same waveguide 406-B for transferring light from the display 424 and light from the display 434. In some embodiments, the additional waveguide is positioned adjacent to, and parallel with, waveguides 406-A and 406-B. In some embodiments, the additional waveguide coupled with one or more input couplers and one or more output-couplers is positioned to receive image light 414-4 from display 434 and guiding the light toward eye 340 as image light 414-6. In some embodiments, display 424 and display 434 are configured to project light with distinct colors. For example, image light 414-1 from display 424 corresponds to a green light and image light 414-4 from display 434 corresponds to a blue light.

Figure 5A:
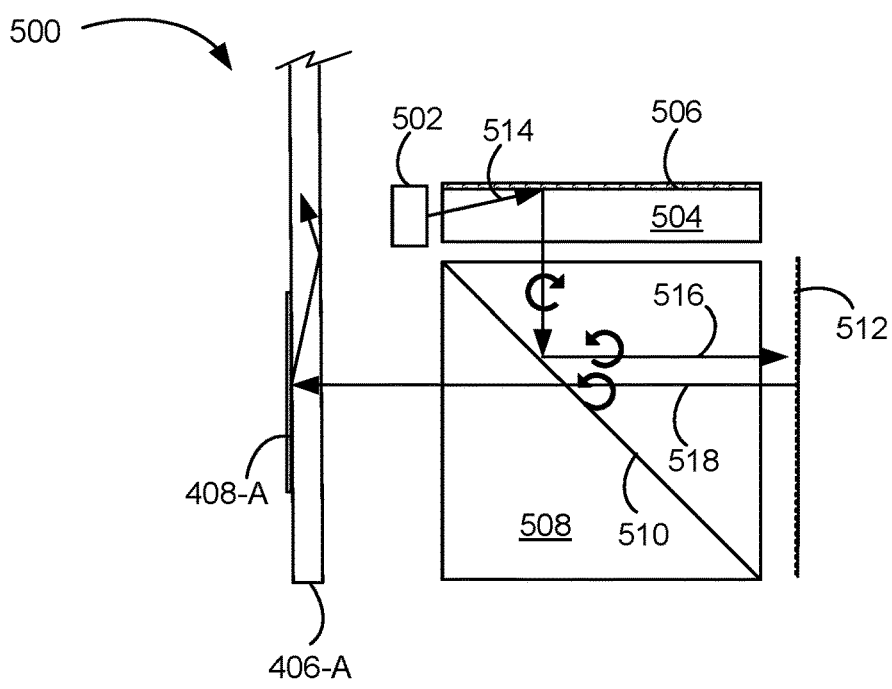
FIG. 5A is a schematic diagram illustrating an LCoS display device in accordance with some embodiments.
Figure 5B:
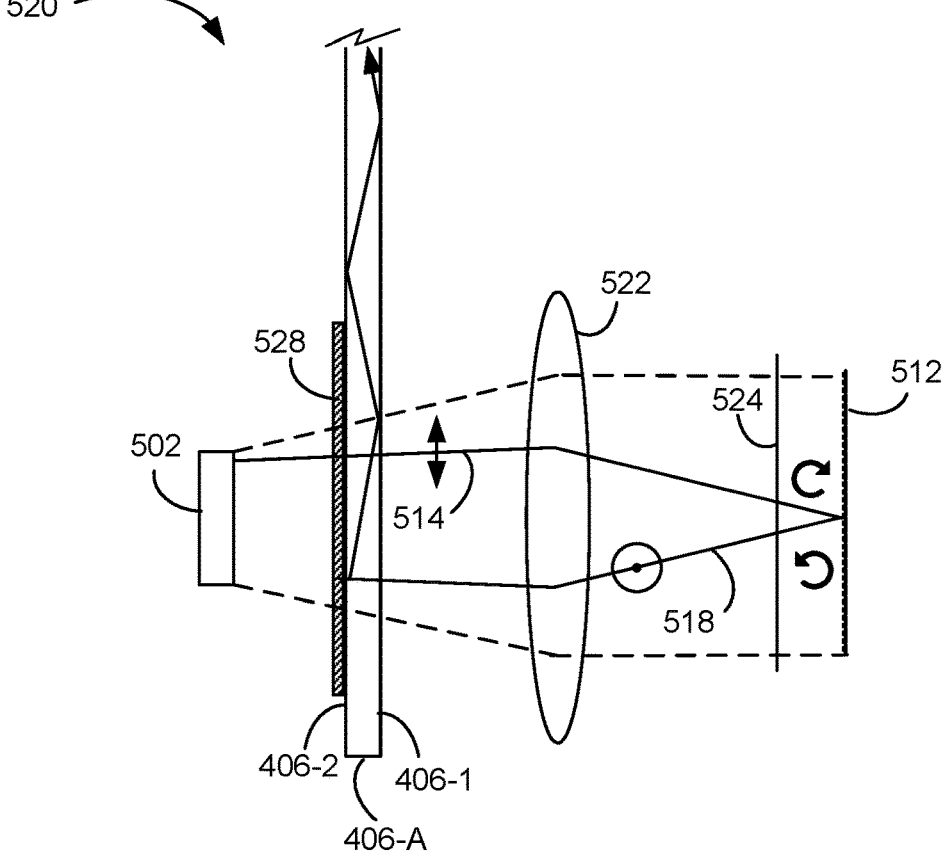
FIG. 5B is a schematic diagram illustrating an LCoS display device in accordance with some embodiments.
Figure 5C:
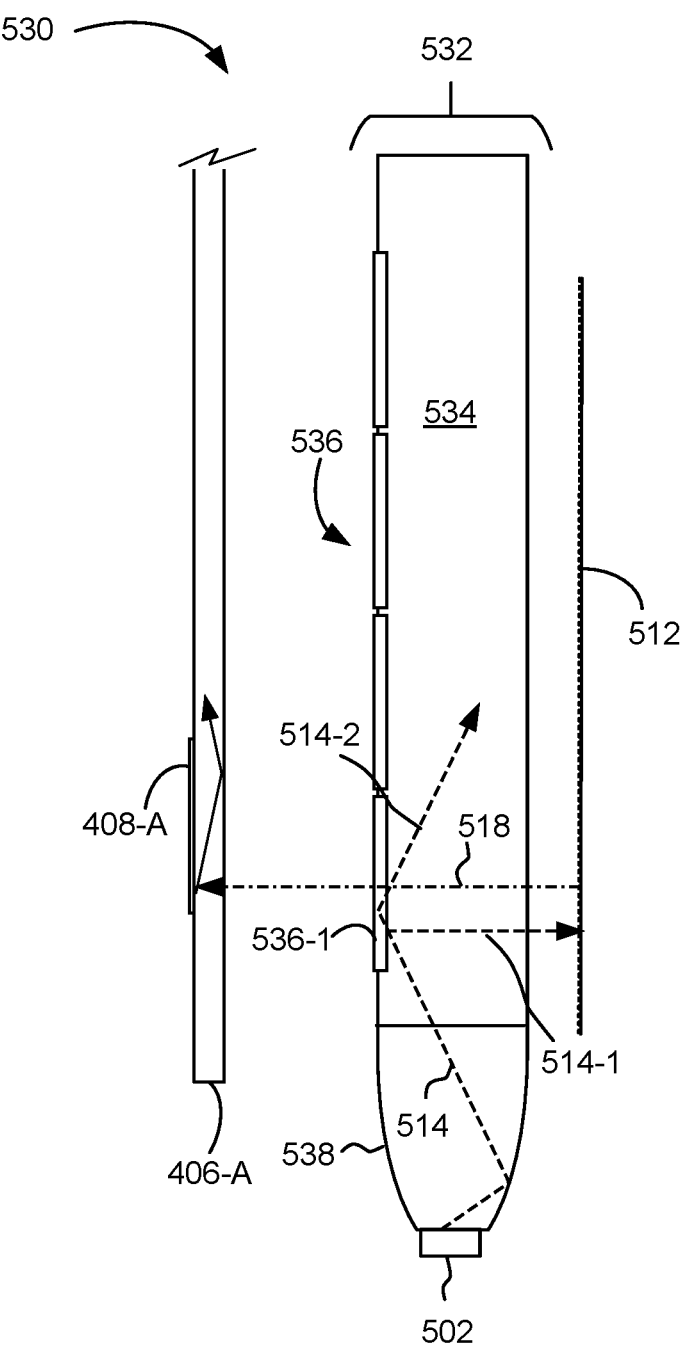
FIG. 5C is a schematic diagram illustrating an LCoS display device in accordance with some embodiments.

FIGS. 5A-5C illustrate schematic diagrams of examples of LCoS display devices for projecting monochromatic image light. Any of such LCoS display devices may be implemented as display 402 in display systems 400, 420, and 430 described with respect to FIGS. 4A-4C. It is noted that in FIGS. 5A-5C, polarization of light is annotated with universal annotations that do not take into account a propagation direction of a respective ray (e.g., the right-handed circularly polarized light is annotated with a counter-clockwise arrow regardless of the propagation direction of light, and the left-handed circularly polarized light is annotated with a clockwise arrow regardless of the propagation direction of light). It is also noted that FIGS. 5A-5C are described independently of each other. For example, a first direction described with respect to FIG. 5A is not necessarily a same direction as a first direction described with respect to FIG. 5B.

FIG. 5A is a schematic diagram illustrating LCoS display device 500 in accordance with some embodiments. In some embodiments, LCoS display device 500 corresponds to display 402 described above with respect to FIG. 4A. LCoS display device 500 includes a monochromatic light source (e.g., light source 502), a beam splitter (e.g., beam splitter 508 including reflective polarizer 510), and an LCoS display panel (e.g., LCoS 512).

In some embodiments, light source 502 includes one or more LEDs, one or more microLEDs, one or more super-luminescent LEDs, one or more organic LEDs (OLEDs), one or more vertical cavity surface-emitting lasers (VC-SELs), or some combination thereof. Light source 502 is configured to project illumination light having a single color (e.g., illumination light 514). For example, light source 502 projects light having a wavelength range corresponding to a red light (e.g., light within wavelength range 635-700 nm).

In some embodiments, LCoS display device 500 includes light guide 504 optically coupled with light source 502. In some embodiments, light guide 504 is a planar light guide. In some embodiments, light guide 504 is a tapered light guide or a parabolic light guide (e.g., a compound parabolic concentrator). In some embodiments, light guide 504 is coupled with, or in direct contact with, optical extraction element 506. In some embodiments, optical extraction element 506 includes one or more reflectors (e.g., one or more mirrors or one or more partial mirrors), one or more partial reflectors (e.g., one or more partial mirrors), or one or more extraction features. In some embodiments, the one or more extractions features include one or more prisms, one or more Fresnel structures, one or more gratings (e.g., one or more surface relief gratings, one or more Bragg gratings, or one or more holographic gratings), or one or more tunable liquid crystal components (e.g., liquid crystal gratings). In some embodiments, the one or more extraction features are embedded or defined in light guide 504. Light guide 504 is positioned to receive illumination light 514 projected from light source 502 and redirect at least a portion of illumination light 514 toward beam splitter 508.

In some embodiments, beam splitter 508 has a cubic shape, and light guide 504 is adjacent to, and optically coupled with, a first facet of beam splitter 508 and LCoS 512 is adjacent to a second facet, distinct from the first facet, of beam splitter 508. In some embodiments, LCoS 512 is positioned so that an optical axis of LCoS 512 is substantially parallel to an optical axis of light source 502.

Beam splitter 508 includes reflective polarizer 510 positioned non-parallel to facets (e.g., the first facet and the second facet) of beam splitter 508. In some embodiments, reflective polarizer 510 is positioned diagonally inside beam splitter 508. Reflective polarizer 510 is configured to reflect light having a particular polarization (e.g., light having a first linear polarization, a first circular polarization, or a first elliptical polarization) while transmitting light having polarization distinct from the particular polarization. In FIG. 5A, reflective polarizer 510 receives illumination light 514 having a first circular polarization and redirects at least a portion of the received light 514 toward LCoS 512. Upon reflection, light having the first circular polarization is converted to light 516 having a second circular polarization different from (e.g., orthogonal to) the first circular polarization (e.g., the first circular polarization corresponds to left-handed circular polarization and the second circular polarization corresponds to right-handed circular polarization or vice versa). In some embodiments, LCoS 512 is positioned to receive illumination light 516 having the second circular polarization. LCoS 512 modulates an amplitude or phase of at least a portion of illumination light 516 and output modulated light (e.g., image light 518). At least a portion of image light 518 output by LCoS 512 having the second circular polarization is transmitted through beam splitter 508 toward waveguide 406-A. Image light 518 is received by input coupler 408-A coupled with waveguide 406-A. Input coupler 408-A redirects image light 518 so that image light 518 continues to propagate inside waveguide 406-A via total internal reflection.

In some embodiments, illumination light 514 is linearly polarized. In such embodiments, reflective polarizer 510 is configured to reflect light having a particular linear polar-ization and transmit light that does not have the particular linear polarization (e.g., light having a linear polarization orthogonal to the particular linear polarization). LCoS dis-play device 500 further includes a retarder plate (e.g., retarder plate 524 shown in FIG. 5B such as a quarter-wave plate) positioned between beam splitter 508 and LCoS 512. The retarder plate is configured to change linearly polarized light into circularly polarized, and vice versa. The retarder plate positioned between beam splitter 508 and LCoS 512 converts illumination light 516 having a first linear polar-ization from beam splitter 508 into illumination light having a first circular polarization. The retarder plate further con-verts image light having a second circular polarization from LCoS 512 into image light 518 having a second linear polarization that is different from the first linear polarization. In some embodiments, the second linear polarization is orthogonal to the first linear polarization so that image light 518 is transmitted through beam splitter 508.

FIG. 5B is a schematic diagram illustrating LCoS display device 520 in accordance with some embodiments. LCoS display device 520 is similar to LCoS display device 500 except that in LCoS display device 520, light source 502 and LCoS 512 are positioned on opposite sides of waveguide 406-A (e.g., waveguide 406-A is located between light source 502 and LCoS 512). For example, light source 502 is facing surface 406-2 of waveguide 406-A and LCoS 512 is facing surface 406-1 of waveguide 406-A. Light source 502 is configured to project illumination light 514 having a first polarization (e.g., a first linear polarization) toward LCoS 512 so that illumination light 514 passes through input coupler 528 and waveguide 406-A.

In addition, input coupler 528 in FIG. 5B is a polarization selective input coupler (e.g., a polarization selective grat-ing). A polarization selective input coupler is configured to redirect (e.g., diffract, deflect, or reflect) light having a particular polarization while transmitting light having a polarization distinct from the particular polarization. In some embodiments, input coupler 528 is a liquid crystal based polarization selective element (e.g., a polarization selective grating including cholesteric liquid crystals), a polarization selective element including a metasurface, a polarization selective element including a resonant struc-tured surface, a polarization selective element including a continuous chiral layer, or a polarization selective element including a birefringent material. For example, a polariza-tion selective element including a continuous chiral layer can be selective on circularly polarized light. As another example, a polarization selective element including a meta-surface or resonant structures can be selective either on linearly polarized light or circularly polarized light. In FIG. 5B, input coupler 528 transmits illumination light 514 having the first linear polarization without changing its direction or polarization.

In embodiments where illumination light 514 projected from light source 502 is linearly polarized, LCoS 512 is optically coupled with a retarder plate (e.g., retarder plate 524). Retarder plate 524 converts illumination light 514 having the first linear polarization to illumination light having a first circular polarization. LCoS 512 receives the illumination light having the first circular polarization and projects image light having a second circular polarization orthogonal to the first circular polarization. Retarder plate 524 transmits the image light as light 518 having a second linear polarization orthogonal to the first linear polarization. Image light 518 having the second linear polarization is then received by input coupler 528 coupled with waveguide 406-A. Input coupler 528 redirects at least a portion of image light 518 so that the at least a portion of image light 518 continues to propagate inside waveguide 406-A via total internal reflection. In some embodiments, illumination light 514 has a circular polarization and retarder plate 524 is omitted.

In some embodiments, LCoS display device 520 further includes one or more lenses (e.g., one or more lenses 522) positioned between light source 502 and LCoS 512. In some embodiments, one or more lenses 522 are configured to focus image light 518 from LCoS 512. In some embodiments, one or more lenses 522 focus image light 518 such that image light 518 transmitted by one or more lenses 522 is more collimated than image light 518 incident on one or more lenses 522. In some embodiments, one or more lenses 522 collimate image light 518.

FIG. 5C is a schematic diagram illustrating LCoS display device 530 in accordance with some embodiments. LCoS display device 530 is similar to LCoS display device 500 except that LCoS display device 530 includes waveguide beam splitter 532 optically coupled with LCoS 512. Waveguide beam splitter 532 is positioned between LCoS 512 and waveguide 406-A. Waveguide beam splitter includes waveguide 354 coupled with one or more extraction features (e.g., extraction features 536). In some embodiments, extraction features 536 are positioned adjacent to a surface of waveguide 534. In some embodiments, extraction features 536 are positioned in direct contact with a surface of waveguide 534. In some embodiments, extraction features 536 are at least partially embedded inside waveguide 534. In some embodiments, extraction features 536 include one or more prisms, one or more Fresnel structures, one or more holographic optical elements, one or more gratings such as volume Bragg gratings or one more surface relief gratings, or one or more light direction turning films.

In FIG. 5C, light source 502 is positioned substantially perpendicular to LCoS 512. Light source 502 is positioned to project illumination light 514 so that illumination light 514 propagates inside waveguide 534. In some embodiments, waveguide 534 is coupled with a light guide (e.g., compound parabolic concentrator 538 or a tapered waveguide). Extraction feature 536-1 of extraction features 536 is positioned to receive illumination light 514 propagating inside waveguide 534 and redirect a first portion of illumination light 514 as illumination light 514-1 to exit waveguide 534 toward LCoS 512. A second portion of illumination light 514, namely illumination light 514-2, undergoes a total internal reflection at a surface of waveguide 534 thereby continuing to propagate inside waveguide 534. LCoS 512 is positioned to receive illumination light 514-1 and project image light 518 through waveguide beam splitter 532 toward waveguide 406-A. Input coupler 408-A is positioned to receive and redirect at least a portion of image light 518 so that the at least a portion of image light 518 enter waveguide 406-A and propagates inside waveguide 406-A via total internal reflection.

Figure 6A:
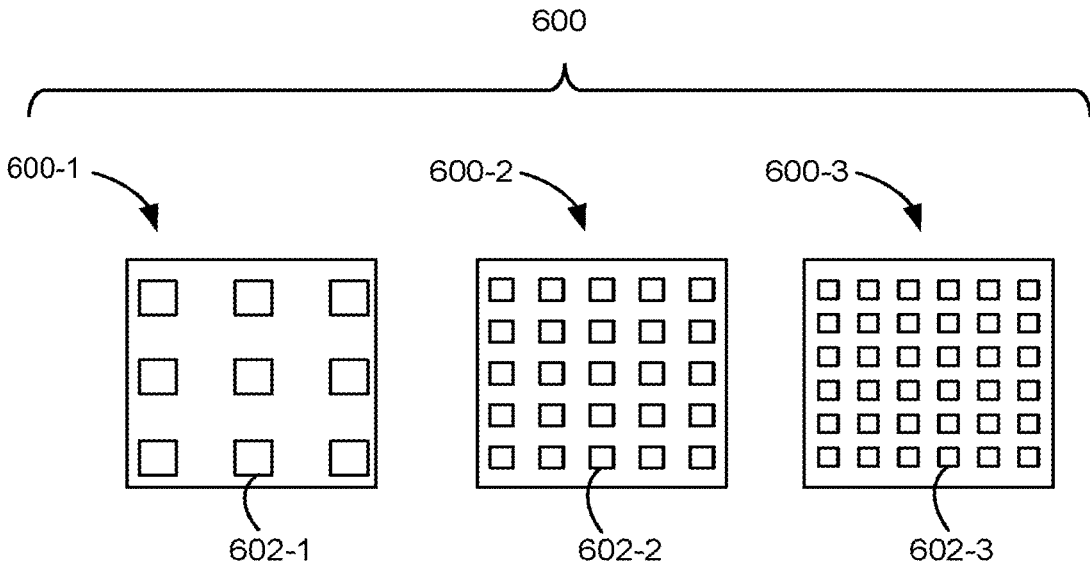
FIGS. 6A and 6B are schematic diagrams illustrating display panels in accordance with some embodiments.
Figure 6B:
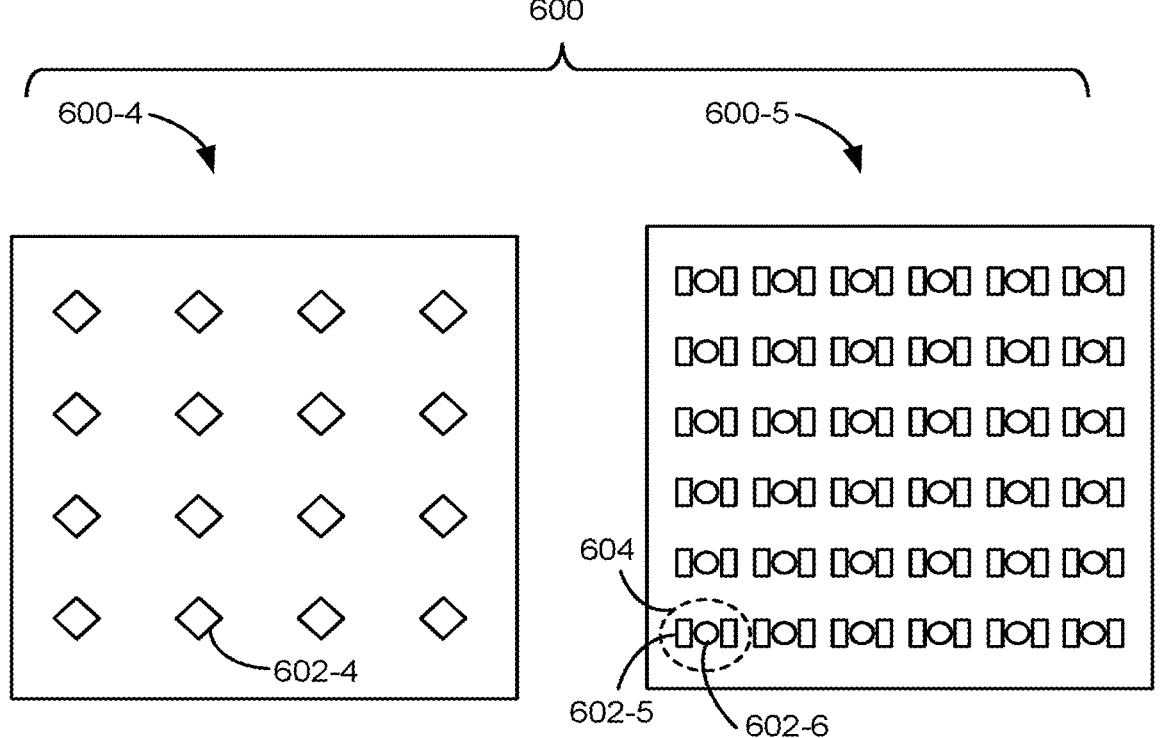

FIGS. 6A and 6B are schematic diagrams illustrating display panels 600 (e.g., display panels 600 including display panels 600-1, 600-2, 600-3, 600-4, and 600-5 in FIGS. 6A-6B) in accordance with some embodiments. Properties of a display panel, e.g., including pixel (or subpixel) brightness, pixel geometry, and pixel density, may be selected so that the display provides bright and uniform images to the user. In particular, a green color is typically displayed with a higher resolution (e.g., higher pixel density) than other colors, such as red and blue, because a human eye is most sensitive to the green color. In some embodiments, display properties of display 402 (e.g., an LCoS display projecting a red light) and display 404 (e.g., an LED or a microLED display projecting green and blue lights) of display system 400 in FIG. 4A are selected so that the images observed by eye 340 of the user have high image quality (e.g., high resolution, high brightness and/or high uniformity). In some embodiments, the optimizing includes applying a pixel rendering algorithm. In some embodiments, a shape, size and/or brightness of pixels of displays 402 and 404 projecting different colors are optimized. In some embodiments, pixels 602 (e.g., pixels 602 including pixels 602-1, 602-2, 602-3, 602-4, 602-5, and 602-6 in FIGS. 6A and 6B) correspond to light emitters of an LED or microLED display. For example, pixel 602 corresponds to one LED or one microLED light emitter. In some embodiments, pixels 602 correspond to pixels of an LCoS display. For example, pixel 602 corresponds to one liquid crystal element on a silicon substrate.

In some embodiments, display 402 (e.g., an LCoS display) and display 404 (e.g., an LED or a microLED display) have different pixel densities and therefore different pixel resolutions. FIG. 6A show example display panels 600 (e.g., display panels 600-1 through 600-3) with arrays of pixels with distinct pixel densities. A pixel density refers to a number of distinct pixels within an area defined by two dimensions. The pixel density is generally measured in units of pixels per inch (PPI). For example, pixel density may be calculated as a number diagonal pixels divided by diagonal size in inches. Higher pixel density is an indication of a higher display resolution. As shown, display panel 600-1 has a first pixel density (e.g., 9 pixels 602-1 per an area of display panel 600), display panel 600-2 has a second pixel density that is greater than the first pixel density (e.g., 25 pixels 602-2 per the area of display panel 600), and display panel 600-3 has a third pixel density that is greater than the second pixel density (e.g., 36 pixels 602-3 per area of display panel 600). In some embodiments, display 402 includes display panel 600-1 and display 404 includes at least one of display panels 600-2 and 600-3.

As shown in FIG. 6A, in some embodiments, display panels 600 include pixels with different sizes. For example, display panel 600-1 has pixels 602-1 with a first size, display panel 600-2 has pixels 602-2 with a second size smaller than the first size, and display panel 600-3 has pixels 602-3 with a third size smaller than the second size. In some embodiments, display 402, which is an LCoS display projecting a red light, includes display panel 600-1 having the lowest resolution (e.g., a lower resolution than the resolution of a display panel for green or blue color) and display 404 projecting a green and/or blue light includes display panel 600-2 and/or display panel 600-3 with a higher resolution than display panel 600-1.

In some embodiments, display panels 600 include different numbers of pixels. For example, display panel 600-1 has a first number of pixels, display panel 600-2 has a second number of pixels greater than the first number of pixels, and display panel 600-3 has a third number of pixels greater than the second number of pixels.

In some embodiments, display panels 600 include pixels 602 with different shapes. In some embodiments, pixels 602 have a square shape, a rectangular shape, a diamond shape, a polygonal shape (e.g., triangular, pentagonal, hexagonal, etc.), a round shape, an elliptical shape, or any combination thereof. In some embodiments, all pixels 602 of a display panel have a common shape. In some embodiments, a display panel includes pixels 604 with two or more different shapes. In some embodiments, all pixels of display panels 600 have a common shape. In some embodiments, display panels 600 have pixels of two or more different shapes (e.g., pixels of a first display panel have a first shape, pixels of a second display panel have a second shape different from the first shape, and pixels of a third display panel have a third shape different from the first shape and/or the second shape). In FIG. 6B, display panel 600-4 includes pixels 602-4 having a diamond shape and display panel 600-5 includes a combination of pixels 602-5 having a rectangular shape and pixels 602-6 having a round shape. In some embodiments, display 402, which is a monochromatic LCoS, includes display panel 600-4 having pixels 602-4 with a diamond shape and display 404, which is not an LCoS display, includes display panel 600-5 having a combination of pixels 602-5 with a rectangular shape and pixels 602-6 with a round shape. For example, pixels 602-5 output a blue light and pixels 602-6 output a green light.

The pixel geometries illustrated in FIGS. 6A and 6B are described for pixels but similar geometries can be used for subpixels (e.g., pixel and subpixels may be used interchangeably herein). In some embodiments, pixels are also called subpixels (e.g., pixels 602-5 and 602-6 may be called subpixels). In some embodiments, a respective pixel of a certain display panel includes two or more subpixels. For example, a pixel can include two, three, four, or five subpixels. In some embodiments, subpixels of a pixel have different sizes, different shapes, and/or are configured to project different colors with different brightness. In some embodiments, pixels 602-5 and 602-6 in FIG. 6B are subpixels of pixel 604.

In light of these principles, we now turn to certain embodiments.

In accordance with some embodiments, a method includes projecting a single color illumination light having a first color (e.g., illumination light 514 in FIG. 5A) on a liquid crystal on silicon display device (e.g., LCoS 512), thereby obtaining a single color image light having the first color (e.g., image light 518 in FIG. 5A corresponding to image light 412 in FIG. 4A has a red color) from the liquid crystal on silicon display device. The method also includes receiving image light having at least a second color (e.g., image light 414 in FIG. 4A) that is different from the first color from a display panel that is different from a liquid crystal on silicon display device (e.g., display 404 that is not an LCoS, such as a microLED display). The method further includes combining the single color image light and the image light (having at least the second color) for projection toward an eye (e.g., eye 340).

In some embodiments, the image light having at least the second color includes light of the second color and light of a third color that is different from the first color and the second color. For example, image light 414 in FIG. 4A has blue and green color components.

In some embodiments, the single color illumination light does not include light having the second color or light having the third color. For example, image light 412 in FIG. 4A and illumination light 514 in FIG. 5A may be monochromatic red light, which does not include light of blue color or green color.

In some embodiments, the image light having at least the second color does not include light of the first color. For example, image light 414 in FIG. 4A does not include light having red color.

In some embodiments, the first color is red, the second color is blue, and the third color is green.

In some embodiments, the light of the second color and the light of the third color are received from one or more display panels. In some embodiments, the light of the second color and the light of the third color are projected from a single display panel. For example, in FIG. 4B, display 424 projects image light having the second color (e.g., green) and light having the third color (e.g., blue) as part of light 414-1. In some embodiments, the two colors are projected from distinct display panels. For example, in FIG. 4C, display 424 projects image light 414-1 having the second color (e.g., green) and display 434 projects image light 414-4 having the third color (e.g., blue). The one or more display panels include light sources configured to emit the light of the second color and light sources configured to emit the light of the third color. In some embodiments, the light sources configured to emit the light of the second color are microLEDs configured to emit the light of the second color, and the light sources configured to emit the light of the third color are microLEDs configured to emit the light of the third color.

In some embodiments, the liquid crystal on silicon display device includes a first number of pixels (e.g., display 402 in FIG. 4A corresponds to display panel 600-1 in FIG. 6A having a first number of pixels). The light sources configured to emit the light of the second color have a second number, different from the first number, of light emitters (e.g., display 404 in FIG. 4A corresponds to display panel 600-2 in FIG. 6A having a second number of pixels different from the first number of pixels). The light sources configured to emit the light of the third color have a third number, different from the first number or the second number, of light emitters (e.g., display 404 in FIG. 4A corresponds to display panel 600-3 in FIG. 6A having a third number of pixels, where the third number is different from the first number and the second number).

In some embodiments, a respective pixel of the liquid crystal on silicon display device has a first size and a first shape (e.g., display panel 600-4 in FIG. 6B has pixel 602-4 with a first size and a diamond shape). A respective light emitter of the light sources configured to emit the light of the second color has a second size and a second shape (e.g., display panel 600-5 in FIG. 6B has pixel 602-5 with a second size and a rectangular shape). The respective light emitter of the light sources configured to emit the light of the second color is configured to satisfy at least one of the following conditions: the second size being different from the first size, and the second shape being different from the first shape (e.g., FIG. 6B). A respective light emitter of the light sources configured to emit the light of the third color has a third size and a third shape (e.g., display panel 600-5 in FIG. 6B has pixel 602-6 with a third size and a round shape). The respective light emitter of the light sources configured to emit the light of the third color is configured to satisfy at least one of the following conditions: the third size being different from the first size or the second size, and the third shape being different from the first shape or the second shape (e.g., FIG. 6B).

In accordance with some embodiments, combining the single color image light and the image light includes coupling the single color image light into a waveguide (e.g., image light 412 is coupled into waveguide 406-A in FIG.

4A). The waveguide is optically coupled to the display panel (e.g., display 404) that is different from a liquid crystal on silicon display device.

In accordance with some embodiments, a device includes a liquid crystal on silicon display device configured to receive a single color illumination light having a first color (only) and provide a single color image light. For example, display system 400 includes display 402 which an LCoS display device for outputting single color image light. In some embodiments, display 402 corresponds to LCoS display device 500 including LCoS 512 that receives single color illumination light 514 and provides single color image light 518 in FIG. 5A. Such liquid crystal on silicon display device has a high efficiency by utilizing optical components having a high efficiency for a narrow spectral bandwidth (e.g., corresponding to the first color). Thus, by eliminating the need for using the liquid crystal on silicon display device for polychromatic spectrum, the efficiency of the display device is improved.

The device also includes a display panel that is different from a liquid crystal on silicon display device (e.g., display 404 in FIG. 4A). The display panel is configured to provide image light (e.g., image light 414) having at least a second color that is different from the first color. In some embodiments, the display panel is a microLED display, which may have a lower efficiency for a particular color (e.g., red). Thus, by combining display panels of different types (e.g., a liquid crystal on silicon display panel and a microLED display panel) configured to emit different colors for which each display panel has a higher efficiency (e.g., combining a liquid crystal on silicon display configured for a color that the liquid crystal on silicon display has a high efficiency and a microLED display configured for a color that the microLED display has a high efficiency), the overall efficiency of the display device is improved.

The device further includes a waveguide (e.g., waveguide 406-A) configured to combine the single color image light and the image light for projection toward an eye.

In some embodiments, the image light having at least the second color includes light of the second color and light of a third color that is different from the first color and the second color.

In some embodiments, the single color illumination light does not include light having the second color or light having the third color.

In some embodiments, the image light having at least the second color does not include light of the first color.

In some embodiments, the first color is red, the second color is blue, and the third color is green.

In some embodiments, the device further includes one or more display panels that include light sources configured to emit the light of the second color and light sources configured to emit the light of the third color (e.g., FIGS. 4B and 4C).

In some embodiments, the light sources configured to emit the light of the second color are microLEDs configured to emit the light of the second color. The light sources configured to emit the light of the third color are microLEDs configured to emit the light of the third color.

In some embodiments, the liquid crystal on silicon display device includes a first number of pixels, the light sources configured to emit the light of the second color have a second number, different from the first number, of light emitters, and the light sources configured to emit the light of the third color have a third number, different from the first number or the second number, of light emitters (e.g., FIG. 6A).

In some embodiments, a respective pixel of the liquid crystal on silicon display device has a first size and a first shape (e.g., FIG. 6B). A respective light emitter of the light sources configured to emit the light of the second color has a second size and a second shape. The respective light emitter of the light sources configured to emit the light of the second color is configured to satisfy at least one of the second size being different from the first size, and the second shape being different from the first shape. A respective light emitter of the light sources configured to emit the light of the third color has a third size and a third shape. The respective light emitter of the light sources configured to emit the light of the third color is configured to satisfy at least one of the third size being different from the first size or the second size, and the third shape being different from the first shape or the second shape.

In some embodiments, combining the single color image light and the image light includes coupling the single color image light into the waveguide that is coupled to the display panel that is different from a liquid crystal on silicon display device (e.g., FIG. 4A).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, in accordance with some embodiments, a display system includes an LCoS display and a display that is not an LCoS (e.g., an LED or microLED display. The LCoS is configured for projecting a single-color image light (e.g., a red light). The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:

projecting a single color illumination light having a first color on a liquid crystal on silicon display device, thereby obtaining a single color image light having the first color from the liquid crystal on silicon display device;

receiving image light having at least a second color that is different from the first color from a display panel that is not a liquid crystal on silicon display device; and combining the single color image light and the image light for projection toward an eye, wherein combining the single color image light and the image light includes coupling the single color image light into a waveguide that is optically coupled to the display panel that is different from a liquid crystal on silicon display device.

2. The method of claim 1, wherein:

the image light having at least the second color includes light of the second color and light of a third color that is different from the first color and the second color.

3. The method of claim 2, wherein:

the single color illumination light does not include light having the second color or light having the third color.

4. The method of claim 3, wherein:

the image light having at least the second color does not include light of the first color.

5. The method of claim 2, wherein:

the first color is red, the second color is blue, and the third color is green.

6. The method of claim 2, wherein:

the light of the second color and the light of the third color are received from one or more display panels that include light sources configured to emit the light of the second color and light sources configured to emit the light of the third color.

7. The method of claim 6, wherein:

the light sources configured to emit the light of the second color are micro light emitting diodes configured to emit the light of the second color; and the light sources configured to emit the light of the third color are micro light emitting diodes configured to emit the light of the third color.

8. The method of claim 6, wherein:

the liquid crystal on silicon display device includes a first number of pixels;

the light sources configured to emit the light of the second color have a second number, different from the first number, of light emitters; and the light sources configured to emit the light of the third color have a third number, different from the first number or the second number, of light emitters.

9. The method of claim 6, wherein:

a respective pixel of the liquid crystal on silicon display device has a first size and a first shape;

a respective light emitter of the light sources configured to emit the light of the second color has a second size and a second shape, wherein the respective light emitter of the light sources configured to emit the light of the second color is configured to satisfy at least one of:

the second size being different from the first size; and the second shape being different from the first shape; and a respective light emitter of the light sources configured to emit the light of the third color has a third size and a third shape, wherein the respective light emitter of the light sources configured to emit the light of the third color is configured to satisfy at least one of:

the third size being different from the first size or the second size; and the third shape being different from the first shape or the second shape.

10. A device, comprising:

a liquid crystal on silicon display device configured to receive a single color illumination light having a first color and provide a single color image light;

a display panel that is not a liquid crystal on silicon display device, the display panel configured to provide image light having at least a second color that is different from the first color; and a waveguide optically coupled to the display panel that is different from the liquid crystal on silicon display device, the waveguide configured to combine the single color image light and the image light for projection toward an eye, wherein combining the single color image light and the image light includes coupling the single color image light into the waveguide.

11. The device of claim 10, wherein:

the image light having at least the second color includes light of the second color and light of a third color that is different from the first color and the second color.

12. The device of claim 11, wherein:

the single color illumination light does not include light having the second color or light having the third color.

13. The device of claim 12, wherein:

the image light having at least the second color does not include light of the first color.

14. The device of claim 11, wherein:

the first color is red, the second color is blue, and the third color is green.

15. The device of claim 11, further comprising:

one or more display panels that include light sources configured to emit the light of the second color and light sources configured to emit the light of the third color.

16. The device of claim 15, wherein:

the light sources configured to emit the light of the second color are micro light emitting diodes configured to emit the light of the second color; and the light sources configured to emit the light of the third color are micro light emitting diodes configured to emit the light of the third color.

17. The device of claim 15, wherein:

the liquid crystal on silicon display device includes a first number of pixels;

the light sources configured to emit the light of the second color have a second number, different from the first number, of light emitters; and the light sources configured to emit the light of the third color have a third number, different from the first number or the second number, of light emitters.

18. The device of claim 15, wherein:

a respective pixel of the liquid crystal has a first size and a first shape;

a respective light emitter of the light sources configured to emit the light of the second color has a second size and a second shape, wherein the respective light emitter of the light sources configured to emit the light of the second color is configured to satisfy at least one of:

the second size being different from the first size; and the second shape being different from the first shape; and a respective light emitter of the light sources configured to emit the light of the third color has a third size and a third shape, wherein the respective light emitter of the light sources configured to emit the light of the third color is configured to satisfy at least one of:

the third size being different from the first size or the second size; and the third shape being different from the first shape or the second shape.

* * * * *